UNITED STATES PATENT OFFICE.

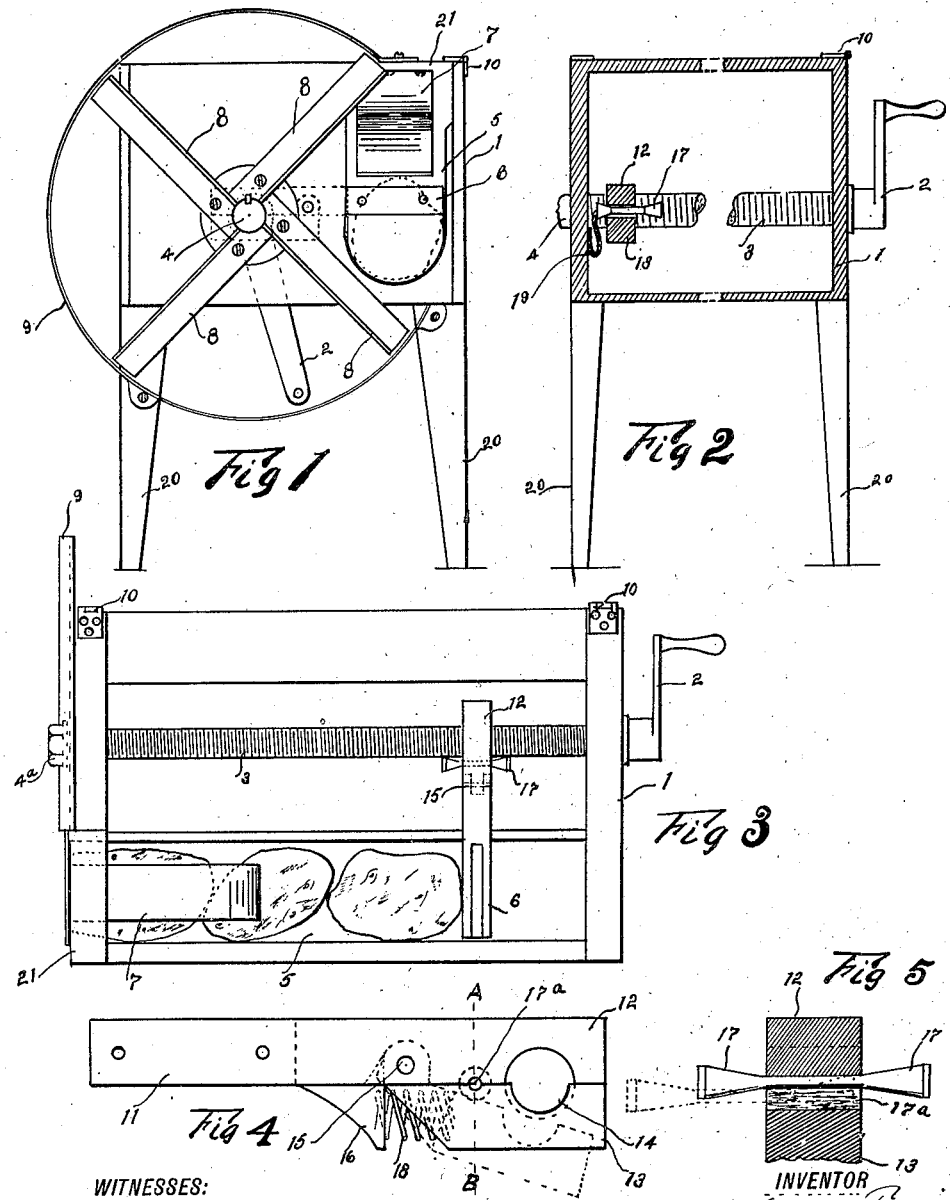

ANTONE GEORGE TOMSICK, OF PUEBLO, COLORADO, ASSIGNOR TO JOSEPH TOMSICK, JR., OF PUEBLO, COLORADO.

ROTATING GEARING.

1,091,871.      Specification of Letters Patent.     Patented Mar. 31, 1914.

Application filed June 5, 1912. Serial No. 701,756.

*To all whom it may concern:*

Be it known that I, ANTONE GEORGE TOMSICK, a citizen of the United States, residing at Pueblo, Colorado, have invented certain new and useful Improvements in Rotating Gearing, of which the following is a specification.

My invention relates to improvements in rotating cutter gearing; and the objects are to provide a rotating cutter gearing that will slice dough, vegetables, or other things by means of the rotating knives, and to automatically space the thickness of the slices, and other objects which will more fully appear in the specifications. I attain these objects by the mechanisms illustrated in the accompanying drawings, in which—

Figure 1 is an end elevation view showing the knives; Fig. 2 is a longitudinal broken cross sectional view showing the screw driving means and release; Fig. 3 is a top plan view; Fig. 4 is a detailed view of the split nut device; and Fig. 5 is a cross sectional view through the line A—B of Fig. 4.

Similar numerals refer to similar parts throughout the several drawings.

A box or case 1 is provided and may be placed on the legs 20 if desired. The side or the top of the box or case may be hinged with the hinges 10 so that the same may be opened up for various purposes. The driving screw 3 has the end crank 2 at one end, and the other end 4 is adapted for the attachment of the knives 8, which knives are attached to a common disk for the purpose. The nut 4ª is designed to hold the knife disk in position. On one side of the box the tube 5 is adapted to receive the dough, vegetables or other thing that is to be cut. A spring 7 is attached to the top 21 so as to hold the object to be cut in position. The head 6 is designed to fit the trough 5 and has attached thereto the driving nut 11. The driving nut 11 is composed of the fixed part 12, provided with a semi-cylindrical recess to permit the passage of a screw 3, and a hinged jaw 13, attached to the fixed part at 15. The spreader spring 18 bears upon the jaw 16 at one end, and at the other end bears upon and is partly inclosed in the pivoted portion 13. The interior surface 14 in pivoted jaw 13 is screw threaded. The channel 17ª extends between the parts 12 and 13. The separator 17 with cone shaped ends is adjusted to fit into the space 17ª. A spring 19 is provided at the knife end to engage with one end of the spreader 17. A guard 9 may be merely a rim or may be a solid back, to protect the operator from any injury. The knives are so adjusted as to come in close contact with the open end of the trough 5. While I have shown but four knives a lesser or greater number may be used, and plates having different numbers of knives may be furnished with the device.

The article to be sliced is placed into the trough 5 and the operator by turning the crank 2 forces the feed 6 forward by reason of the split nut 11 engaging the screw threaded bar 3 until the feed 6 has reached the spring 19, when the spring forces the separator 17 into the channel 17ª and releases the screw threaded portion 13 from engagement with the screw threaded bar, when the feed 6 together with the nut may be brought back into position by the operator adjacent to the crank 2 and the spreader is released by contact with the end of the box, so that the screw threaded portion 13 again engages the screw threaded bar 3 and the operation of slicing may be repeated.

I claim:—

In a rotating cutter gearing of the character described, a split nut comprising a hinged portion attached to a fixed portion, a spiral spring disposed in said hinged portion and adapted to force and retain the same against said fixed portion, a bar provided with expanded ends disposed in appropriate space between the said hinged and fixed portions and extending beyond said split nut and adapted to engage means to force said bar between said hinged and fixed portion so as to spread said nut, all substantially as set forth.

Witness my signature.

ANTONE GEORGE TOMSICK.

Witnesses:
JOSEPH A. TOMSICK,
MAUDE S. ENGLE.